SAMPLED DATA REDUCTION AND STORAGE SYSTEM

Filed Nov. 9, 1964 7 Sheets-Sheet 1

INVENTOR
ALBERT W. VINAL
BY Roger S. Smith
ATTORNEY

United States Patent Office 3,344,406

Patented Sept. 26, 1967

3,344,406

SAMPLED DATA REDUCTION AND STORAGE SYSTEM

Albert W. Vinal, Owego, N.Y., assignor to International Business Machines Corporation, New York, N.Y., a corporation of New York Filed Nov. 9, 1964, Ser. No. 409,638
10 Claims. (Cl. 340—172.5)

ABSTRACT OF THE DISCLOSURE

A system for reducing and storing data received over multiple input channels. Means are provided for sequentially sampling the multiple channels and supplying data samples for storage in a first storage unit. Analog samples are first processed through an A/D converter where they are placed in a suitable format for storage. Upon receipt, each sample is compared with reference criteria from a reference data storage unit. If the criteria are met, the sample is stored in the main storage unit along with channel identification generated by counter means operating coincidentally with the channel sampling means. Time of occurrence information is also stored in the main storage unit by the same counter mechanism designed to perform a timing function. The reference storage unit stores separate storage criteria for each channel. When a chanel is sampled, the reference storage unit is addressed with the channel identity so the reference criteria individual to that channel can be withdrawn from storage. This criteria includes the value of the last data item selected for storage from that channel, together with limit information specifying how much a new item should differ from that value to warrant storage. Each time a new item qualifies, its value is placed in the reference storage unit in place of the previously stored reference value.

Figure 1:
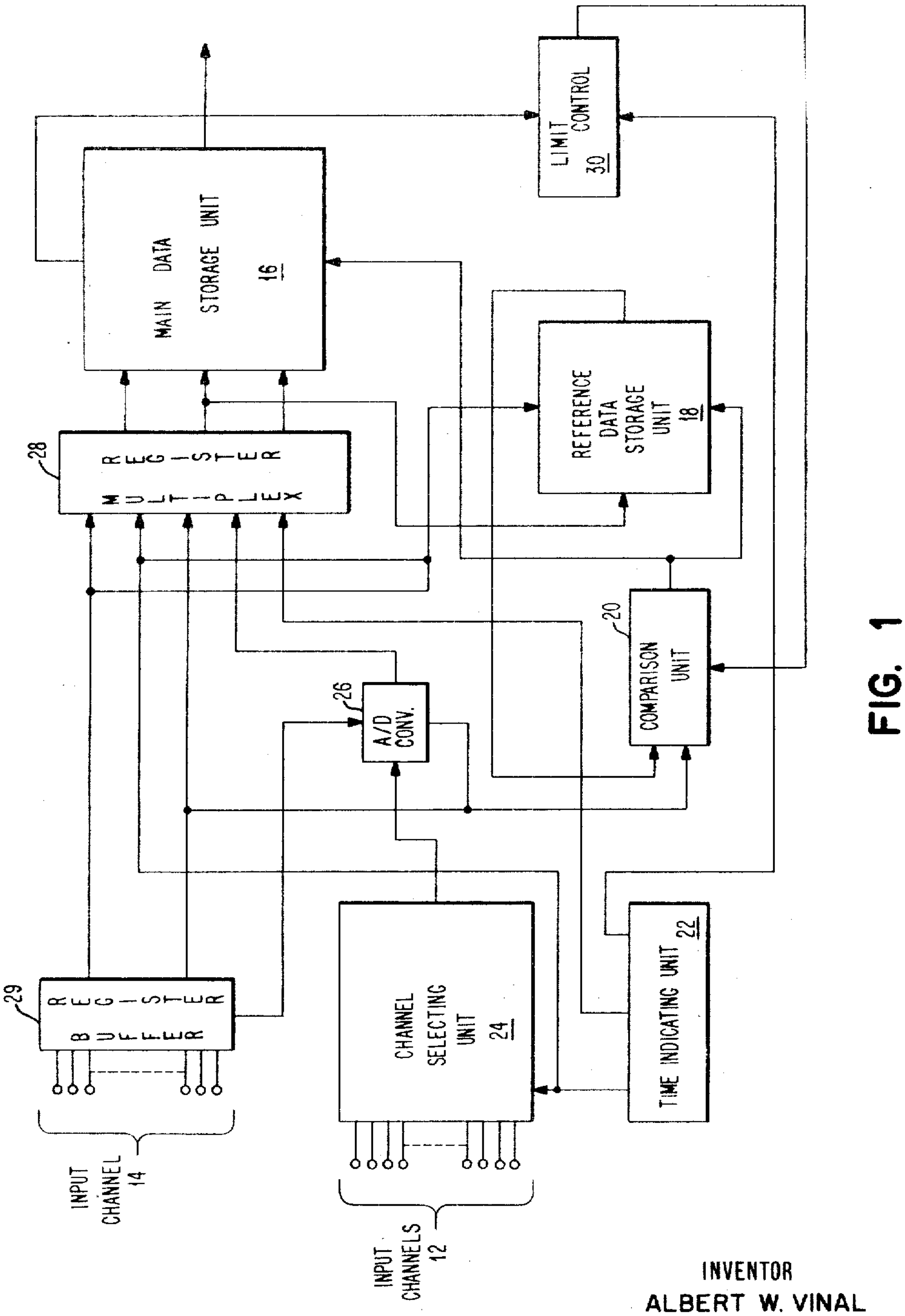

Means is provided for interrupting the scanning operation of certain channels to afford priority to predetermined channels. The multiple channel inputs include digital data channels as well as analog data channels. A limit control is provided which recognizes when the incoming data input is filling the main storage unit at a rate which will exhaust its capacity before a data collecting operation is completed. The limit control means, in response to an indication from the data rate sense means overrides the limit information in the reference storage unit and establishes increased limits to effectively reduce the number of data items selected for storage.

This invention relates generally to data storage systems, and more particularly to systems for sampling time related data, eliminating redundant information and storing the remainder. The invention described herein was made in the performance of work under a NASA contract and is subject to the provisions of the National Aeronautics and Space Act of 1958, Public Law 85–568 (72 Stat. 426; 42 U.S.C. 2451), as amended.

Systems of the kind here involved are usually referred to as data reduction systems and find application wherever it is required to monitor various operations and to store an accurate record of them for later use. Examples of such applications are airborne data recording and industrial process control. In monitoring any time-related operation wherein changes may occur at random, a sampling rate, high with respect to normally expected changes, is necessary to insure that no significant change is missed. It has been found that data resulting from such sampling techniques contains a vast amount of redundant information, and that some reduction of data is necessary to permit storage of the information.

The copending application "Differential Quantitized

Storage and Compression," Ser. No. 162,816, filed Dec. 28, 1961 by this inventor, now U.S. Patent 3,225,333, issued Dec. 21, 1965, and assigned to the assignee hereof, discloses a system for reducing a train of sampled data in such a way that all redundant or insignificant information is eliminated but no signficant data is lost, and the time relation of the data is preserved. The reduction technique disclosed in that application may be briefly described as "significant event detection." Means are provided for comparing each item of sampled data with the last item found worthy of storage. If the new item is within specified limits, it is considered redundant and is ignored. If it falls outside the specified limits it is stored, along with time-of-occurrence data, and its value becomes the basis for comparison of future data. Thus, only significant (greater than the limits) changes are recorded for later use and all other data is discarded.

In accordance with this invention, the significant event detection technique of the above-mentioned application is employed in a system wherein multiple channels of data are present, some of which provide data in one form and some in another and some of which have a unique priority status. The present invention provides means for reducing multiple channel data of the type described, so that significant events in each channel are faithfully recorded together with appropriate time-of-occurrence and channel identification information.

Accordingly, it is a primary object of this invention to provide a data sampling, reducing and storage system having the ability to handle multiple input channels of randomly occurring data.

It is also an object of this invention to provide a sampling, reducing and storage system wherein significant events in each channel are identified for storage in accordance with criteria individual to the channel wherein the events occur.

Another object of the invention is to provide such a system wherein the significant data from multiple channels are stored in a common storage means, appropriately tagged with originating channel and time-of-occurrence information.

A further object of the invention is to provide, in a system of the type described, means for accurately keeping track of the proper comparison criteria for each channel to be sampled, and for making the proper criteria available when needed.

It is another object of the invention to provide in a data sampling, reducing and sotrage system means for receiving information in diverse formats and storing it in common format.

It is a further object of the invention to provide means for handling incoming information from certain channels on a sequential basis and other channels on a priority basis whenever data is made available in said other channels.

It is also an object of the invention to provide, in a system of the type described, means for changing the criteria for storage during a data acquisition mission in response to indications of the amount of storage space used and the amount of sampling time remaining.

The foregoing objects are achieved in a system which includes storage units, one for storing the sampled and reduced data and the other for storing comparison criteria or reference data for the several input channels. Means are provided for sampling the several channels on a sequential and/or priority basis and for translating the acquired data to a common format. The sampling means includes apparatus for identifying the originating channel for each data item acquired, and this channel identification is used to withdraw the proper comparison information from the reference data storage unit. Comparison means match this information with the data item and make the significance determination. Time recording means cou- ›led to the system keep track of the time-of-occurrence of :ach data item acquired, and if the item is determined o be significant, the time-of-occurrence, as well as the ›riginating channel identification are stored along with he data in the main data storage unit. Concurrent with torage in the main storage unit, the item is also stored n the reference storage unit to provide an updated ref- :rence against which future data in the originating channel ıre measured to determined significance.

In a system of the type just described, data collection :an continue uninterrupted until the main data storage ınit has been filled. It is desirable in many situations that :ollection be made independent of storage size. This is eadily accomplished in accordance with the present in- 'ention by providing a second main data storage unit vhich may be switched into the circuit as an alternate to he first unit, to allow collection of data to continue, while he first unit is being emptied or read out, for example, to ı tape unit. The storing and reading speed parameters of he two data storage units are arranged so that the rate at vhich one unit may be read out is significantly higher han the normal rate at which the other unit is being filled. Γo account for special circumstances where rapidly vary- ng input data causes one unit to be filled at a rate which, f allowed to continue, will fill it before the other is being :mptied, means are provided for temporarily altering the imits beyond which data values must lie to be considered .ignificant, to reduce the number of significant events so hat the system is allowed to catch up and avoid cata- strophic failure. The system is thus adaptive, to the ex- :ent that variation of criteria is possible.

The provision of the alternate memory units and the ırrangement of means for varying the criteria for deter- nining significance in accordance with the relative rates for filling and emptying of the two memory units are also important objects of this invention.

The foregoing and other objects, features and advan- tages of the invention will be apparent from the follow- ing more particular description of preferred embodiments of the invention, as illustrated in the accompanying drawings.

Figure 2A:
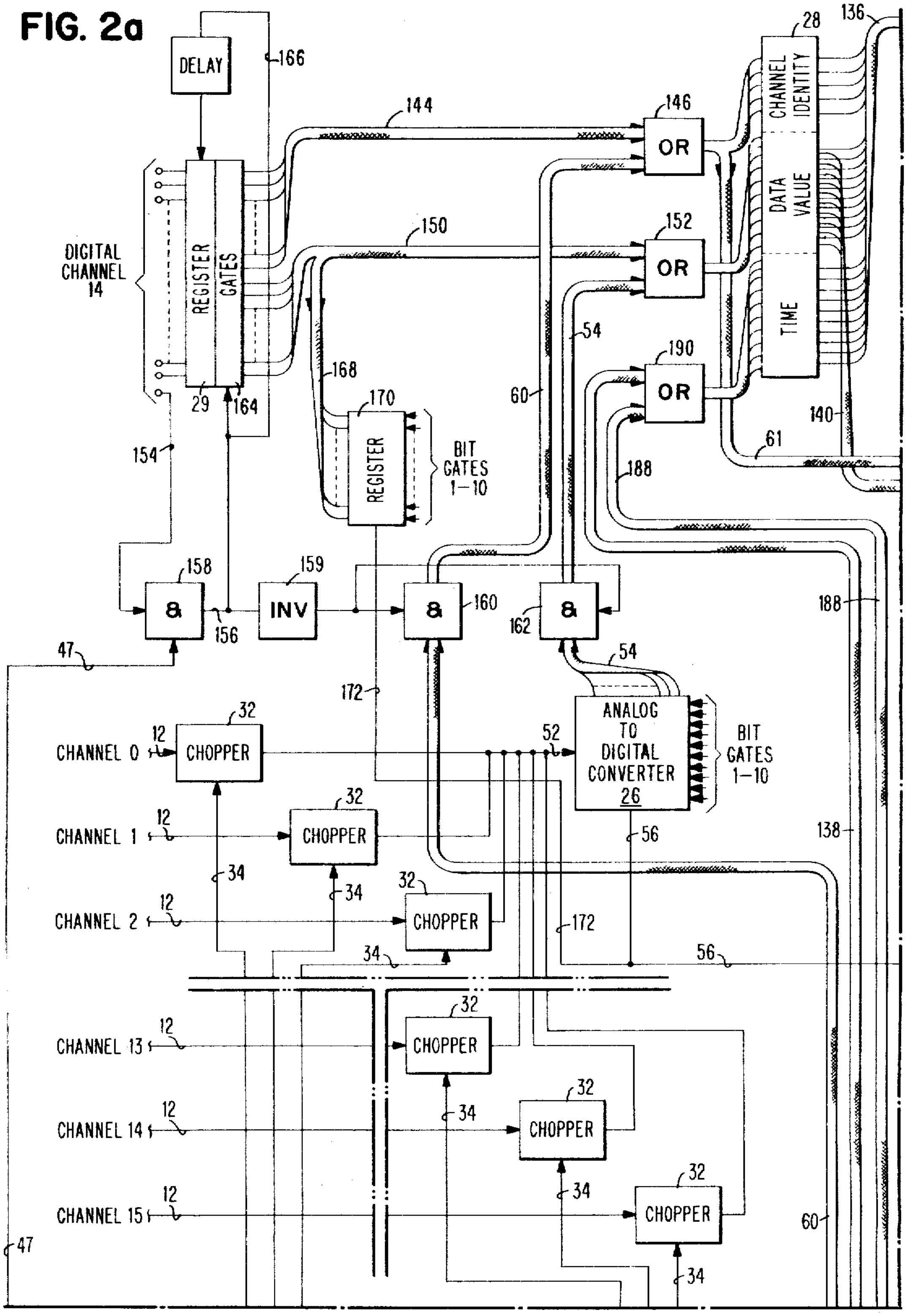
Figure 2B:
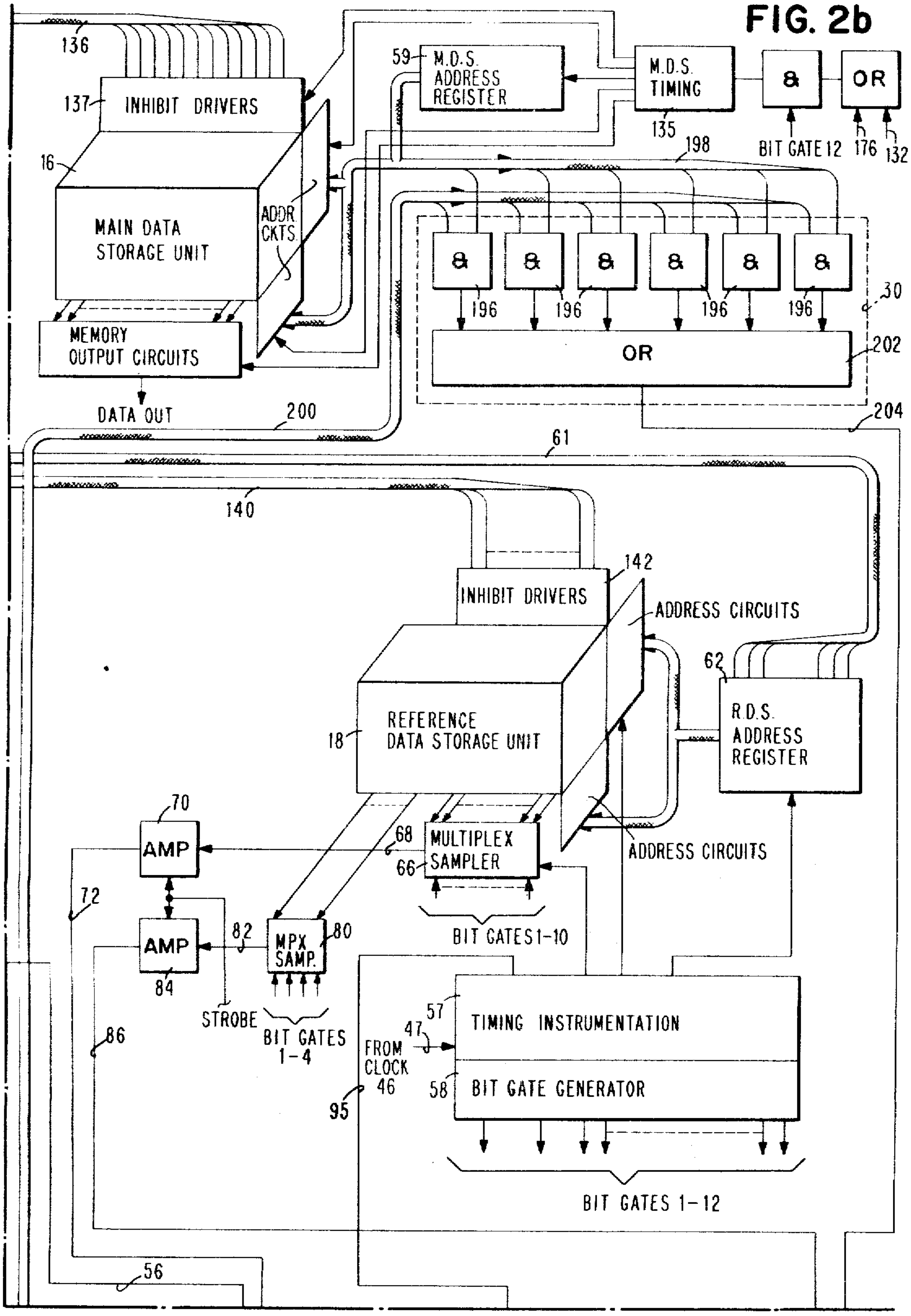
Figure 2C:
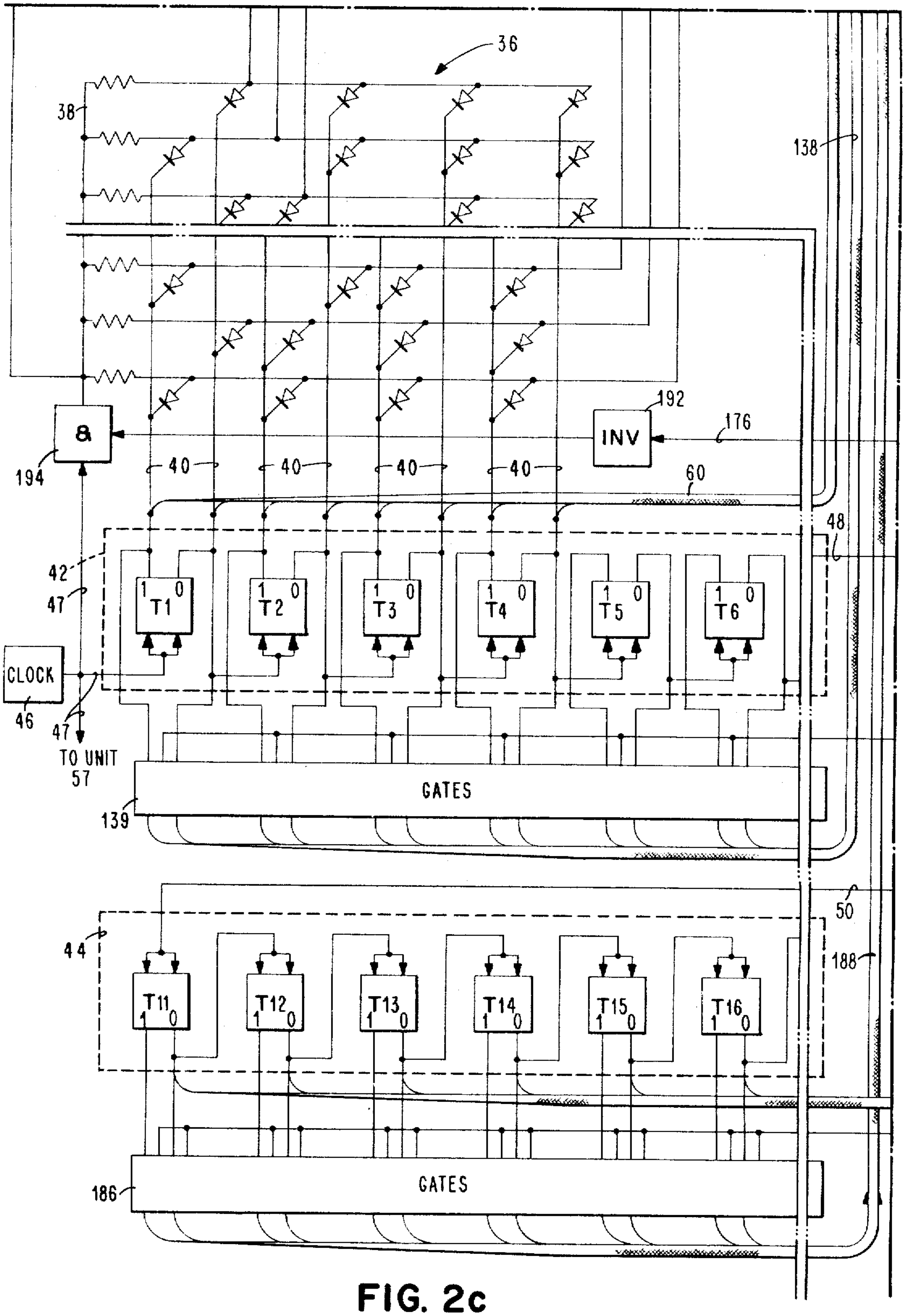
Figure 2D:
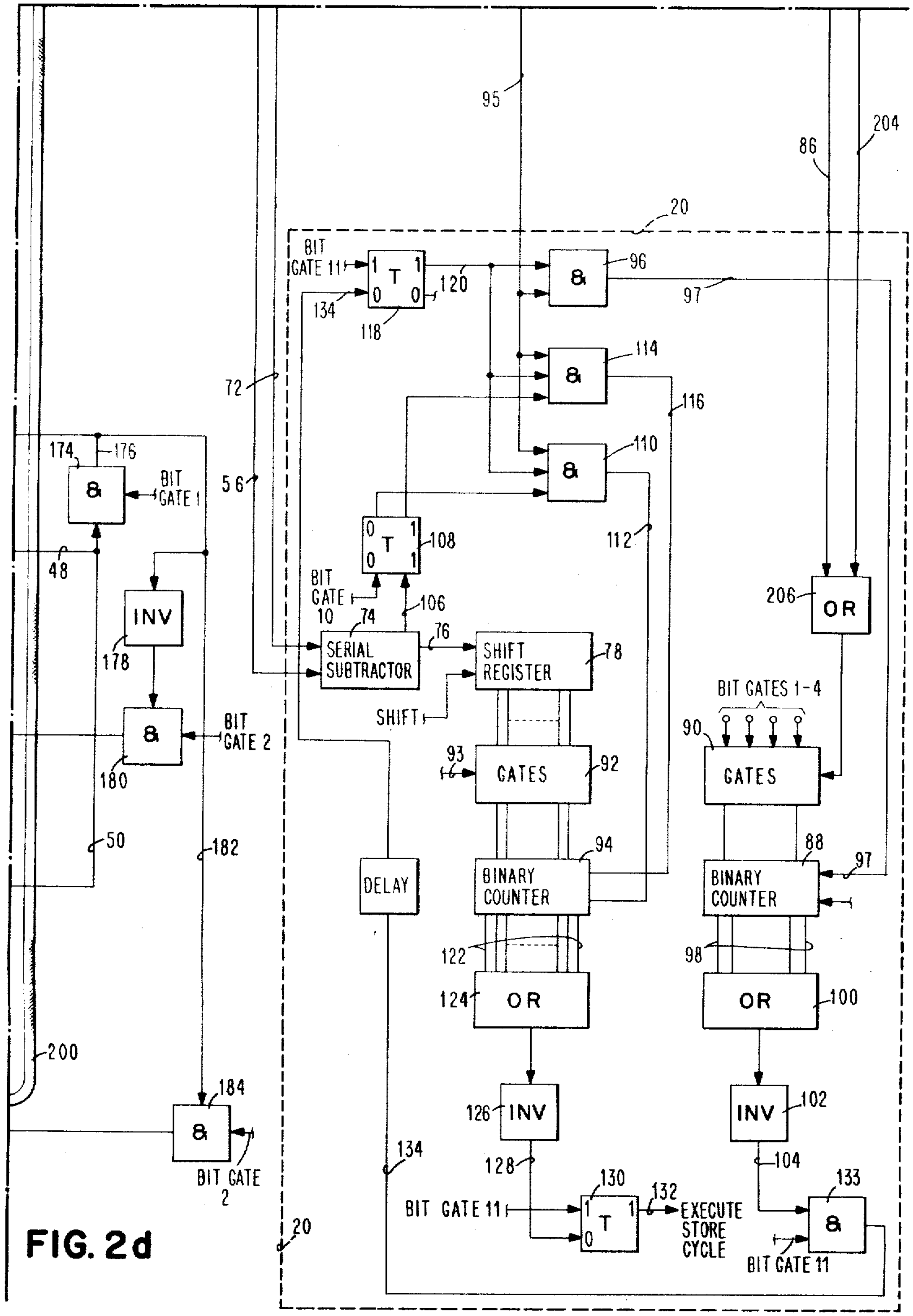
Figure 5:
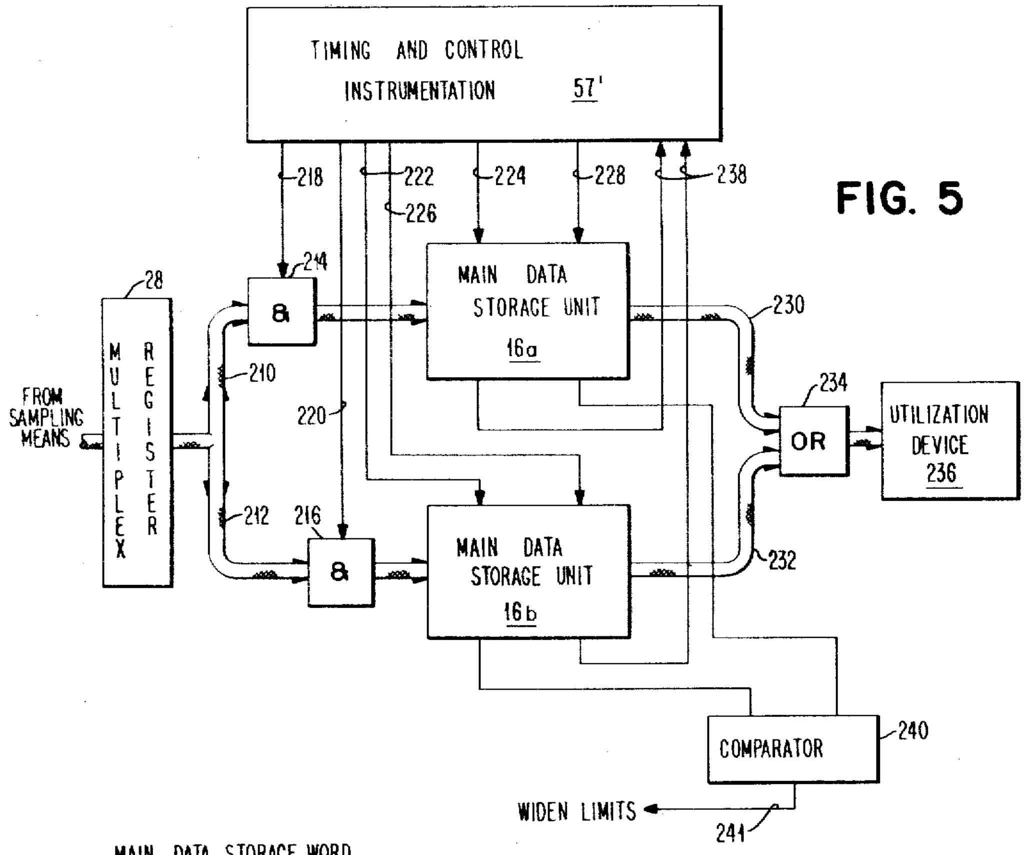
Figure 3A:
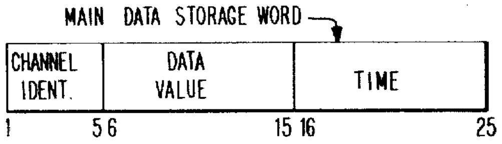
Figure 3B:
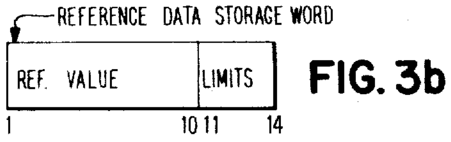
Figure 2E:
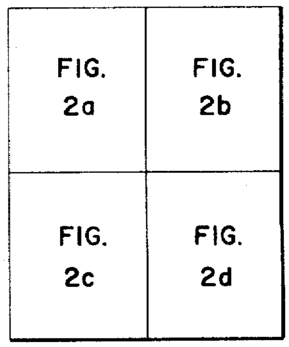
Figure 4:
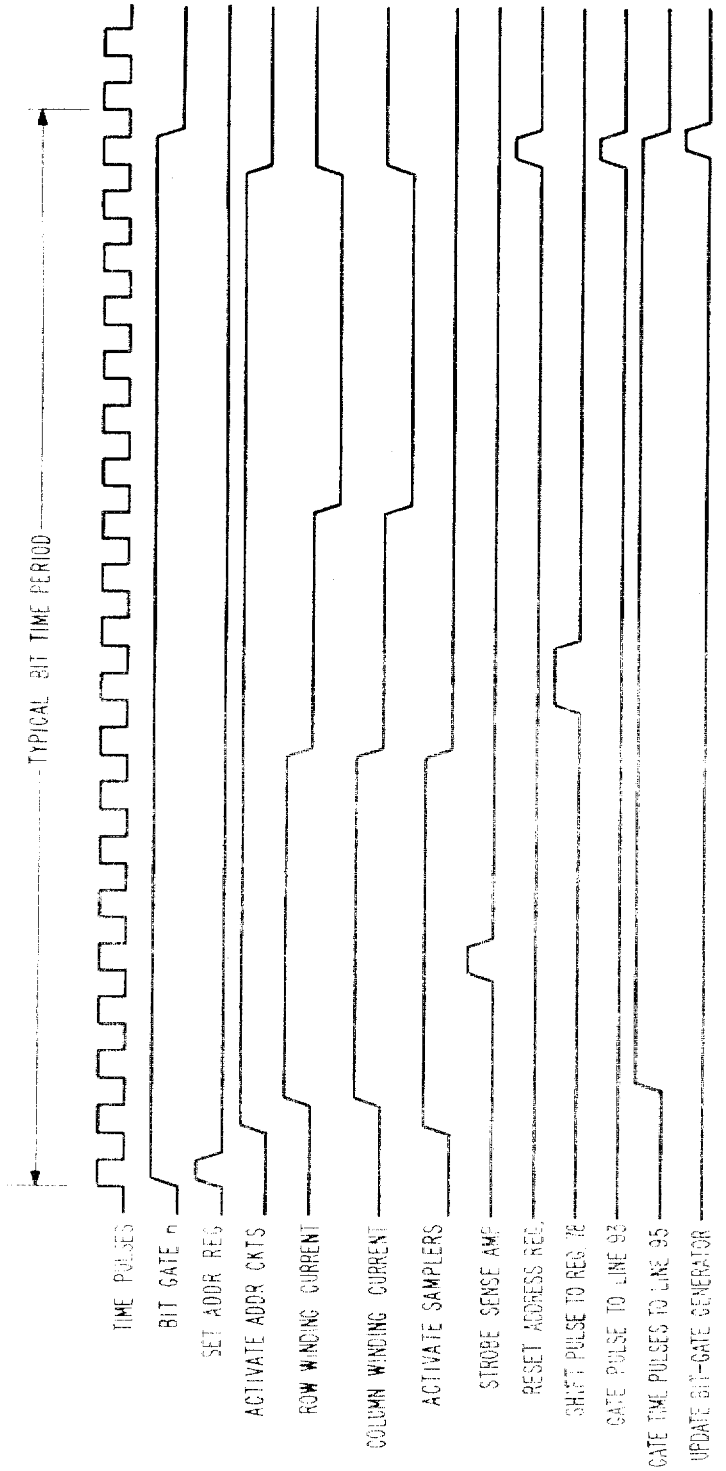

In the drawings:

FIGURE 1 is a block diagram illustrating a data reduction and storage system embodying the present invention;

FIGURES 2*a* through 2*d*, inclusive, when placed together as shown in FIGURE 2*e*, form a schematic circuit diagram of the system shown in FIGURE 1;

FIGURES 3*a* and 3*b* are illustrations of typical information formats employed with the system disclosed in FIGURES 1 and 2*a*–2*d*;

FIGURE 4 is a timing diagram showing typical timing relationships in the system; and FIGURE 5 is a block diagram showing a modified storage system which may be employed in this invention.

GENERAL DESCRIPTION—FIGURE 1

An illusrtative data handling system embodying the present invention is shown generally in FIG. 1. This system includes groups 12 and 14 of input channels for receiving incoming data on a real-time basis. In accordance with the teachings of this invention, the data supplied via inputs 12 and 14 is stored in a main data storage unit 16, in a reduced form. Criteria for determining what data items are to be stored is maintained in a reference data storage unit 18. The incoming data is compared with the reference data in comparison unit 20 to determine whether the criteria for storage are met. A time indicating unit 22 keeps track of the time-of-occurrence of data items received.

As mentioned earlier herein, this invention takes advantage of a data reduction technique termed "significant event detection." In accordance with that technique, incoming data on any input channel is stored in the main data storage 16 only if it represents a significant change from the last data item stored from that channel. To accomplish this, the reference data storage unit has a separate addressable memory register provided for each of the input channels 12 and 14. Each of these registers contains the value of the last significant event which occurred in that channel, together with data indicating the limits beyond which a new data value must lie to be considered a new significant event.

The data handling system provided by this invention is capable of handling both analog and digital information and will receive information in serial or parallel form. Priority among the several channels may be pre-assigned, but handling of certain randomly occurring data on an itnerruption basis is contemplated. For purposes of illustration of these several capabilities, it is assumed that each of the several input lines 12 represents a separate analog channel, and that the several lines 14 represent a single multi-bit digital channel wherein information is supplied in parallel-by-bit form. It is further assumed that the parallel digital information is supplied at random intervals. Accordingly, means are provided for handling this digital information on an interruption basis.

Each of the analog input channels 12 constantly monitors a condition (for example, a voltage associated with the acceleration of an aircraft or space craft, or a voltage associated with a selected parameter in a process control system) and presents an analog signal representative of the present status of that condition. Channel selecting unit 24 samples each input channel on a regular basis under control of the time control unit 22, and passes each analog sample to an analog to digital converter 26. The A/D converter 26 provides a multi-bit binary digital equivalent value for each sample. This value is supplied to the multiplex register 28 associated with the main data storage 16, and to the comparison unit 20.

Concurrent with the transmission of the data sample to the A/D converter 26, the address of the channel sampled is sent from the time indicating unit 22 to the multiplex register 28. Signals indicating the time-of-occurrence of said sample are also sent from unit 22 to register 28.

The channel address information is also sent to the reference data storage 18 where it is used to obtain access to the reference value and limits associated with the sampled channel. These reference and limit values are transmitted to the comparison unit 20. The timing of the system is such that they arrive in the comparison unit 20 concurrently with the corresponding digitized sample so that a comparison may be effected.

The reference and sample values are compared by obtaining their difference, and the difference value is compared with the limit values associated with the sampled channel. If the difference value does not exceed the limits, it is not considered significant and is discarded. The several registers holding the sample and identification data are cleared and a new sample is taken from a selected channel. If, however, the prescribed limits are exceeded by the difference between the sample and reference values, a signal is transmitted to both storage units 16 and 18 to cause them to execute information storage cycles. The main data storage unit stores, at the lowest available address, the several values stored in the multiplex register 28. The reference storage unit 18 stores, at the address associated with the sampled channel, only the digitized sample value. This value replaces the former reference value and becomes the new measure for determining the next significant event. The limit information also stored at that address is not changed.

Information on channel 14 is handled in substantially the same manner as just described. When such information is presented, a signal is supplied to seize the next sampling and storage cycle, disconnect the analog channel information from register 28, and substitute the information on channel 14 therefor. The data supplied by channel 14 includes at least a data value and address information identifying the channel. A buffer register 29 stores information from channel 14 until a sampling and storage cycle can be seized. This data is then transmitted to the multiplex register 28. Time-of-occurrence information is supplied to register 28 from unit 22 as in the case of the analog channels. (In the alternative, the time data may be supplied by the channel 14 itself.) The address information from channel 14 is also fed to the addressing circuits of reference data storage 18 to obtain proper reference and limit values for comparison. The data value is sent to the comparison unit 20 to be measured against the reference and limits data. As with the analog channel information, the digital values located in the multiplex register 28 are stored in the memory 16 if the storage criteria are met. In this event, the value supplied to register 28 is fed to the reference storage unit 18 for storage in place of the previous reference value.

In a system such as that shown in FIG. 1, it sometimes occurs that the number of items qualifying for storage during a given acquisition operation exceeds expectations and the main data storage unit 16 is filled at a rate which, if allowed to continue, will exhaust the storage space before the previously allotted time has expired. In such a case, it is desirable to readjust the storage criteria to reduce the number of items qualifying for storage so that some semblance of completeness of the data package is obtained, rather than to leave a period where no data is recorded. In accordance with this invention, the "fullness" of the main data storage 16 is constantly compared with elapsed time, and if the storage space is being consumed too rapidly, the limits beyond which data values must lie to qualify for storage are widened. This function is performed by limit control means 30 which receives the present time from unit 22 and the current address from memory 16 and compares them. So long as the comparison indicates that time is progressing as fast or faster than the memory address, the normal limits are observed. When, however, the current memory address is higher than allowable at a given time, a signal is sent out to suspend the normal limits associated with each channel and to establish an arbitrary wide limit. The wide limit remains in effect until the control unit 30 indicates that the storage space available is back in proper proportion.

With this general understanding of the invention, reference may be made to FIGS. 2*a*–2*d* for a detailed description of the various cooperating parts of the system.

DETAILED DESCRIPTION—FIGURES 2*a*–2*d*

The system shown in FIGS. 2*a*–2*d* is assumed to handle sixteen channels of analog input data and one digital channel. As indicated in FIG. 3*a*, information format of the data to be stored in the main data storage unit includes five bit positions for channel identification, ten positions for the data value, and another ten positions for time-of-occurrence data. The reference data against which incoming information is measured comprises, as shown in FIG. 3*b*, ten binary bits of reference value data and four limit value bits.

Information flow through the system is both serial and parallel. Information flowing to the memory units is handled in parallel-by-bit form while information flowing to the comparison unit is handled in serial fashion to conserve hardware. It will be appreciated, of course, that a completely parallel format could be employed, if desired.

As will become apparent as the description progresses, the system samples one data channel each millisecond and performs the associated comparing and storing or discarding functions. Each one millisecond interval is divided into a plurality of bit-times, for example, twelve, to accommodate the serial processing of the individual data value bits in the comparison unit, and the ultimate storage of the sample, if it meets the storage requirements. Each bit-time is arranged to accommodate a complete cycle of operation of the reference data storage unit. The details of the various timing functions are not given herein since these considerations are matters of design and well within the purview of those skilled in the art. General timing considerations are illustrated in FIG. 4. As will be apparent, the basic synchronism of the system is controlled in accordance with the one millisecond sampling rate, and the twelve bit-times in each one millisecond interval.

*Analog channel selection and low order time counter.*—FIGS. 2*a* and 2*c* show the analog channel selecting and sampling means. As indicated earlier herein, the several analog input channels 12 are sampled in an orderly sequence by the unit 24 under control of time indicating unit 22. Each of these input channels comprises a line 12 which carries a signal representing a condition. The signal lines are fed to a plurality of electronic switches or choppers 32, which connect them to a common output. Each chopper 32, which may be of any conventional design, has a separate control input 34 upon which actuating signals are received. These inputs 34 are supplied from a switching matrix 36, which comprises a plurality of diode AND gates, for example. The AND gates are powered from a common bus 38, and each of the lines 34 is arranged to receive a pulse when all of the diode inputs coupled to that line are present and the bus 38 is activated. The inputs for the AND gates of matrix 36 are supplied by leads 40. Since there are sixteen analog channels, four-bit binary addresses are required, and each AND gate of matrix 36 has four input lines 40 representing the true or complement conditions of the binary address.

The switching matrix 36 is controlled by time control unit 22. As indicated in FIG. 2*c*, this unit includes a pair of binary counters 42 and 44 arranged to keep track of real time in convenient increments. These increments are selected to satisfy the sampling requirements of the data handling system, and are determined by the repetition rate of a clock pulse generator 46. As stated, a typical time increment is one millisecond, so a clock frequency of 1 kc. is assumed in this embodiment. The clock pulses are supplied via line 47 to the counting input of the low order time counter 42 and to the bus 38 of matrix 36. The binary counter 42 has ten stages and, accordingly, the ability to count 1024 milliseconds. It is convenient to have the lower order time counter 42 keep track only of milliseconds, so it is connected in accordance with well-known teachings to be reset at counts of 1000 milliseconds. A carry is generated on line 48 upon occurrence of the maximum count of 1000, and this carry is supplied via line 50 to the counting input of high order time binary counter 44. The high order counter may include any number of stages, for example, ten, and keeps track of seconds to the limit of its capacity, 1024 seconds in the illustrative example.

Four stages of the low order counter 42 are used to address the sixteen analog channels 12. The identity of the four stages selected and the arrangement of their connection to lines 40 of matrix 36 determines the sequence in which the channels are sampled. In the embodiment shown in FIGURE 2*c*, the four lowest order stages are used and their true and complement outputs are connected as shown so the channels will be sampled in sequence, once each 16 milliseconds.

The actual sampling period is determined by the width of the pulses received on line 38 from clock 46 and may be adjusted as required. The analog sample passes through the activated chopper 32 and is fed via common output line 52 to the A/D converter unit 26. A/D converter may be of any well-known design and will not be described in detail herein. Devices fully satisfactory for the purposes of this invention may be found in Chapter 11 of the text "Digital Computer Components and Circuits," by Richards, D. Van Nostrand Co. Inc., 1957. Suffice it to say that the A/D converter 26 is capable of producing a ten-bit binary digital value corresponding to each analog input received. The unit 26 is provided with one group of ten output lines 54 upon which the digital value is presented in parallel form, and a single output line 56 upon 'hich the digital value is presented on a serial-by-bit asis, low order bit first. The serial output is synchronized y bit-gate pulses 1 through 10 supplied from a bit-gate enerator 58 which is part of the general time control ıstrumentation 57 of the system. The generator 58 comrises a ring counter having twelve stages. The generator 8 is sequenced through its twelve stages once during each millisecond time interval. The twelve outputs of the enerator 58 provide bit-time synchronizing pulses or bitates for various parts of the system including the conerter 26.

*Storage units.*—The parallel bits on cable 54 are supplied to the multiplex register 28 as shown in FIG. 2*a*. 'his register holds them available for storage in the main ata storage unit 16 and the reference data storage unit 8. The storage units 16 and 18 are random access memry units capable of storing digital information quantities ı parallel form. The units 16 and 18 may be of any nown design compatible with the remainder of the sysım herein disclosed. The non-destructive random access ıemory and associated driving circuitry disclosed in the opending application mentioned above are particularly 'ell adapted for the purposes of this system. Accordıgly, storage units of this type are assumed in the illus:ative embodiment. No detailed description of the memry units will be given herein since reference to applicaon Ser. No. 162,816 and the reference therein cited rovide a full disclosure.

Inasmuch as the data items qualifying for storage in nit 16 are accompanied by origin and time-of-occurrence ıformation, they need not be stored in any particular rder. Accordingly, a simple sequential addressing system ; employed by this unit. Such an addressing system inludes an address register 59 having the capability to ıcrement its contents by one following each accessing peration. Typical instrumentation for such an addressing cheme is shown in the above-mentioned application.

The reference data storage unit 18 contains reference riteria for the various channels and is addressed by the hannel identification signals supplied from the channel election apparatus. Since the four low order outputs rom counter 42 are used for channel selection, they constitute sufficient address information. These bits are supılied on cable 60 to register 28. Cable 60 connects to the our low order positions of the five-bit address section ›f register 28, leaving the high order bit set to zero. As llustrated in FIGS. 2*a* and 2*b*, cable 60 supplies these ignals via branch 61 to the address register 62 of memıry unit 18 to provide access to the proper storage locaions. It will be recalled that the digital sampled value upplied from converter 26 to the comparison unit 20 is ı serial form. Accordingly, the memory 18 is arranged o supply the reference value in serial form. This serialiation of the contents of an addressed storage location ›f unit 18 is accomplished by repeatedly reading the adlressed storage location and sampling only one bit storage ›osition thereof during each reading operation. Memıry unit 18 is controlled by generator 58 to perform a eading cycle during each of bit times 1–10. A multiplex ampler 66 is coupled to all of the memory sense lines orresponding to bit storage locations of unit 18 containng reference data values. As shown in FIG. 2*b*, these are he first ten bit planes. The sampler 66, under control of ›it-gate outputs 1–10 of bit-gate generator 58 produces he serialized output. Operation of a multiplex sampler ›f this type is described in U.S. patent application Ser. No. '9,722, by this inventor, now U.S. Patent 3,231,871, issued an. 25, 1966, and assigned to this assignee.

The bits of reference data retrieved from memory 18 hrough the sampler 66 are supplied via line 68 to sense mplifier 70. The amplified serialized data value is sup›lied from sense amplifier 70 to the comparison unit 20 ›n line 72.

*Comparison unit.*—Referring now to FIG. 2*d* of the lrawings, lines 56 and 72 which carry the serialized sample and reference values, are supplied to the input of a serial subtracter 74. It will be recalled that these serial values are read from the converter 26 and memory 18, respectively, under control of the bit-gate outputs 1–10 of bit-gate generator 58. Accordingly, corresponding bits of both values (which were serialized low order bit first) reach the subtracter 74 simultaneously. The binary subtracter 74, which may be of any conventional design, for example, the one shown at p. 421 of the text entitled "Pulse and Digital Circuits," by Millman and Taub, McGraw-Hill Book Co., Inc., 1956, provides at its output 76 in serial fashion, low order bit first, the difference between the sample value and the reference value. This difference value is accumulated in shift register 78 as it is developed. Shift pulses, which may be generated, for example, from the main timing instrumentation 57, move the difference value into the shift register in proper order as they are developed.

After a complete difference value has been stored in register 78, i.e., after bit time 10, this value may be compared with the limit information associated with the sampled channel. The limit information, it will be recalled, is stored along with the difference value in memory unit 18, and is read from the memory 18 along with the reference value. Referring back to FIG. 2*b*, the sense lines associated with the bit storage positions of each register used for storing limit information (the last four bit planes) are connected to a multiplex sampler 80 which operates under control of bit-gate pulses 1–4 (it will be recalled that there are four limit bits associated with each reference value). The sampler 80 serializes the limit information and supplies it on line 82 to sense amplifier 84. The amplified limit information is supplied from amplifier 84 via line 86 to a binary counter 88. Since the limit value is in serial form, gating means 90, also controlled by bit gates 1–4, provides for the loading of the four bit binary limit value in the binary counter 88 to preset the counter to the limit value associated with the channel being sampled.

The reference value accumulated in shift register 78 is read out at the end of bit time 10 in parallel through gates 92 to binary counter 94. A control line 93 from means 57 performs this gating function. At the completion of the tenth bit time then, counters 88 and 94 contain respectively the limit value and the binary difference between the sampled value and the reference value for the channel being sampled. A determination of the relationship between this difference value and the limit is accomplished by simultaneously operating the two counters to effectively decrement both the difference value and the limit value in synchronism. If the difference value goes to zero before the limit value goes to zero, it is apparent that the difference did not exceed the limit and that the data sampled from the associated channel need not be stored. If the limit value goes to zero before or at the same time as the difference value, then it is apparent that the difference value was equal to or greater than the limit and storage of the information sampled from the associated channel should be effected.

Decrementing of the limit value containing counter 88 and recognition of the all zeros condition thereof is substantially straightforward. The counter is decremented under control of pulses on line 95 from instrumentation 57. These pulses are applied, through gate 96, the function of which will be later described, to a count-down line 97 for counter 88. The conditions of the several stages of binary counter 88 are minitored through lines 98. The lines 98 are connected in the counter so that they carry positive voltages when the stages which they monitor are in the binary one condition. The lines 98 connect to an OR circuit 100, the output of which controls an Inverter circuit 102. It will be appreciated that so long as the binary counter 88 represents a number other than zero, one or more of the lines 98 will be energized and the OR circuit 100 will produce an output. Under these conditions the Inverter 102 does not supply an output. When all stages of the binary counter 88 are in the zero condition no output is supplied through OR circuit 100 and Inverter 102 will supply a positive signal on its output line 104 to indicate this all zeros condition.

Decrementing the value in the binary counter 94 is somewhat more complex since this value may be either in a true binary form or in a two's complement form. It will be recalled that the difference value supplied to binary counter 94 is developed by subtracting the sample value supplied on line 56 from the reference supplied on line 72 in the subtracter 74. If the sample value is less than the reference value, the output of the subtractor is in true binary form and the value loaded in counter 94 is the true difference. In this event, it is necessary to actually decrement the counter 94 to effectively decrement the difference value. If, however, the sample value on line 56 was greater than the reference value on line 72 the output of the serial subtracter is in two's complement form, and the value loaded in binary counter 94 is the two's complement of the actual difference. In this event, the binary counter must be incremented to effectively decrement the difference value. Whether the value stored in counter 94 is the true difference of the complement thereof, is determined by whether there is a borrow generated during the subtraction of the high order bits in subtracter 74. If such a borrow is present, an output is supplied on borrow line 106 of subtracter 74 to set the borrow Trigger 108. This trigger is reset at the beginning of bit time 10 so that it is only in the binary one condition if a high order borrow is present. The decrementing pulses supplied on line 95 to counter 88 are also supplied to the counter 94. If the condition of borrow Trigger 108 indicates that the value in counter 94 is the true difference then pulses on line 95 are supplied through AND gate 110 to a count-down control line 112 for counter 94. If the Trigger 108 is set to the one condition indicating that the value in counter 94 is the two's complement of the difference, then gate 114 is activated to pass the count pulses on line 95 to count-up control line 116.

As previously indicated, the various control pulses for the comparison unit 20 are developed from the timing instrumentation 57. Since it is not desirable to decrement counters 88 and 94 before the serial reference and sample values have been fully processed, means are provided to prevent the decrementing of counters 94 and 88 until bit time 11. The means for accomplishing this consists essentially of a Trigger 118 which is set by bit gate 11 from the bit gate generator 58. When Trigger 118 is on, an output is supplied on line 120 to condition each of the AND gates 96, 114 and 110. Thus, the decrementing of counters 94 and 88 occurs during the eleventh bit time after the complete reference criteria has been read from the storage unit 18.

Referring again to the counter 94 shown in FIG. 2*d*, it has been stated that if the value contained therein is in true form this counter is decremented, while if the value is in two's complement form the counter is incremented. The condition of the counter 94 is continuously monitored by monitor lines 122 which commonly connect to OR circuit 124. As in the case of the monitoring means for counter 88, the lines 122 carry signals when any of the stages of counter 94 are in the binary one state. Accordingly, OR circuit 124 supplies an output to Inverter 126 at all times except when the counter 94 is in the all zeros condition. When the counter 94 indicates the binary count of zero, no signals are supplied to OR circuit 124 and Inverter 126 produces an output on its output line 128. The output on line 128 is used to reset Trigger 130 which was set in the binary one condition at the beginning of time 11. The binary one output line 132 of Trigger 130, when energized, represents a command to the main data storage unit 16 to store the information recorder in multiplex register 28.

It will be apparent to those skilled in the art that the circuitry just described will produce an "Execute Store Cycle" command on line 132 whenever the actual difference value in binary counter 94 exceeds the limit value in binary counter 88. Both of these counters are being driven toward zero in synchronism. An output on line 104 indicates that counter 88 has reached zero and an output on line 128 indicates that counter 94 has reached zero. If the limit counter reaches zero before the difference value counter, the output on line 104 is supplied through AND gate 133 (which is activated only during bit gate 11) and line 134 to reset Trigger 118. Sufficient delay is provided in the signal path between gate 133 and Trigger 118 so that if counter 88 is in the all zeros state at the beginning of bit time 11, Trigger 118 will be reset immediately after it is set. Resetting of this trigger discontinues the count-down of counter 94. If counter 94 has not reached zero, Trigger 130 will remain in the binary one state to which it was set at the beginning of time 11 and an execute store command will be supplied on line 132. If, however, binary counter 94 reaches zero before counter 88, then the line 128 is energized to reset Trigger 130 and no output will be supplied on line 132 during that comparison operation. Since the all zeros condition is selected, counting unit 94 up when a two's complement of the difference value is stored therein effectively recomplements the value when the counter has passed its maximum count and reached the zero condition.

The execute store command line 132 connects to the main data storage unit timing instrumentation 135 to initiate operation thereof. Timing instrumentation 57 causes the actual storage cycle produced by this command to take place during bit time 12, for example, by the gating arrangement shown. The manner in which unit 16 stores information contained in register 28 is well-known in the art. As shown in FIG. 2*b*, the various bit positions of register 28 are connected via cable 136 to inhibit drivers 137 for the storage unit 16. These inhibit drivers, when energized in accordance with the binary values stored in register 28, control the states to which the various conditions of the addressed storage location of unit 16 are driven.

At the time of storage, register 28 contains five bits which identify the channel from which the current sample was taken, a ten bit data value, and ten bits which represent the time-of-occurrence of the current data sample. These last ten bits are loaded in register 28 from low order time counter 42 and represents the present millisecond interval. To conserve space, the contents of high order time counter 44 are not stored with each sample. The time bits are supplied via cable 138 which receives the bit values from the several stages of counter 42 through gates 139. Gates 139 are controlled from timing instrumentation 57 and are opened at a convenient time, for example, during bit time 2 to load register 28.

If the result of the comparison between the current sample from the channel under consideration and the reference value relating to that channel indicates that the new information qualifies for storage, then in addition to storing this information in unit 16 it is also necessary to update the reference value in reference storage unit 18. This updating is also accomplished during bit time 12. As illustrated in FIGS. 2*a* and 2*b*, the ten data value bits in multiplex register 28 are supplied via cable 140 to the inhibit drivers 142 for the bit positions 1–10 of reference data storage unit 18. Accordingly, if line 132 is energized at bit-time 12, the reference data storage unit 18 is caused to execute a store cycle at the address indicated by memory address register 62. This is, of course, the address of the currently active channel.

At the end of bit-time 12, all activities with regard to the channel under consideration have been completed and the system may be reset preparatory to sampling a new sample. Reset pulses are generated by timing instrumentation 57 at the end of bit-time 12 to reset the multiplex register 28, the memory address register 62, and the binary counters 94 and 88.

*Digital channel.*—As indicated earlier herein, the infornation supplied from the parallel digital channel 14 is handled on an interrupt basis. Referring to FIG. 2*a*, channel 14 is shown as providing inputs to buffer register 29. Fifteen bit positions are provided, five for channel identification and ten data value bits. The channel identification bits are supplied from buffer register 29 via cable 144 to the channel identification section of register 28. As shown schematically in FIG. 2*a*, OR circuit 146 connects cable 144 to register 28 in common with the cable 60. The data bits from register 29 are supplied via cable 150 to the data bit section of register 28. OR circuit 152 connects cable 150 to register 28 in common with cable 54 from the analog to digital converter 26.

The digital channel 14 includes a sixteenth line identified by reference character 154 which provides a signal to indicate that the randomly occurring information on channel 14 is available for consideration. When information is made available on channel 14 it is desired to allow this channel to seize the next one millisecond sample period of the storage system and to override the analog channel which normally would employ this interval. The buffer register 29 holds the digital value pending completion of a sampling interval which may be in progress. Seizure of the next available sampling period is accomplished by gating the signal present on line 154 to interrupt command control line 156 at the beginning of a one millisecond sampling interval. Gate 158 controlled by the one millisecond clock pulse on line 47 produces the interrupt signal on line 156 at the beginning of a sampling interval. This signal causes Inverter 159 to close gates 160 and 162 in the analog channel address and data value cables 60 and 54 respectively so that no analog channel information will be supplied to the multiplex register 28. It also activates gate 164 associated with register 29 to pass the digital channel information to lines 144 and 150. Through a delay loop 166, the signal on line 156 also resets register 48. Time-of-occurrence information supplied to register 28 on line 138 is not affected since it is desirable to store the time-of-occurrence of the random digital information in the same manner that time-of-occurrence data with respect to the analog channels is stored. The measurement of the information supplied by the digital channel and the storage or discarding of this information is accomplished in the same manner as previously described. The channel identification is supplied on line 61 to the memory address register 62 of reference data storage unit 18 to call forth from that unit the reference and limit values associated with the digital channel. The data value stored in the buffer register 29 is supplied via cable 168 to serializing register 170 and under control of bit times 1–10 delivered via line 172 to the sample value input of serial subtracter 74. If the information in the digital channel meets the requirements for storage, the twelfth bit time established by generator 58 results in storage of the digital channel information recorded in multiplex register 28 and replacement of the ten reference data bits formerly stored in unit 18 at the address associated with that channel with the current data value bits.

*High order time counter.*—As mentioned earlier herein, memory space is saved by storing only the low order time bits from register 42 with the data samples in memory unit 16. In order to indicate during which one second interval certain values were stored, means are provided for storing the contents of the high order time counter 44 once during each second to provide time marks. These one second time marks are stored in response to a signal on the carry-out line 48 from low order counter 42. When line 48 is energized to update counter 44 a signal is supplied to AND circuit 174. This signal is gated to output line 176 by bit gate 1 from bit generator 58. The signal on line 176 deactivates an Inverter 178 which controls a gate 180 in the control line for gate 139 of counter 42 so these gates will not be activated. The signal on line 176 also provides an input via line 182 to AND gate 184 so that in response to bit gate 2 from bit gate generator 58 the gates 186 of high order counter 44 are opened and the count contained in this counter is supplied by cable 188 to the time bit positions of multiplex register 28. Reference to FIG. 2 shows that the cable 188 is coupled to register 28 in common with cable 138 through OR circuit 190.

The pulse on line 176 is also supplied to Inverter 192 which controls a gate 194 in the clock pulse line 47 extending to the analog channel switch matrix and to the gate 158 for the digital channel interrupt circuit. When Inverter 192 receives a pulse from line 176 gate 194 is closed and both the analog and digital channels are effectively deactivated. Accordingly, no address information and no data value information is loaded into multiplex register 28. The signal on line 176 is further supplied to the main data storage timing unit 135 where it is effective to command a storage cycle of that unit during bit time 12 of the current one millisecond interval. In this way, the one second time mark, which includes only the reading of counter 44, is stored in the main data storage unit 16. The fact that this is a one second marker is apparent from the fact that the first 15 bit positions of the word containing the mark are set to zero (there being no channel address or data value bits stored).

It will be apparent to those skilled in the art that if desired, the one second marker may be used to address and store information concerning an additional channel (not shown in the present embodiment), if such a channel exists and if it is sufficient to record the data occurring in that channel only once each second. In the interest of simplicity no such arrangement is shown in the present embodiment.

*Limit control.*—The limit control means 30 which widen the limits in situations where the unit 16 is being filled too rapidly, are shown in FIG. 2*b*. The means 30 comprises a comparator for comparing the content of the main data storage address register 59 with the high order time counter 44. This compartor may consist of a plurality of AND circuits 196 which receive inputs via cables 198 and 200 from the address register 59 and counter 44. These AND circuits each test for various relationships between the two values which are indiciative of too rapid filling of unit 16 and provide outputs to OR circuit 202. For example, one AND circuit 196 may receive input from the "on" side of highest order bit position of register 59 which would contain a binary one when unit 16 is one fourth full (in a case where unit 16 contains 4096 storage locations, this would be the bit position representing $2^{10}$ in the address word) and another input from the "off" side of the $2^8$ trigger of counter 44. Thus, if register 59 has passed the quarter mark but counter 44 has not, a signal is applied to OR circuit 202. Other AND circuits 196 will test for the relationship when register 59 reaches the half, three-quarters, and other predetermined fullness conditions.

The OR circuit 202 will provide an output on line 204 whenever the unit 16 is being filled too fast. This output is commoned through OR circuit 206 with line 86 which loads limit information from reference storage unit 18 to counter 88. When line 204 is activated, each position of the counter 88 is preset to a binary one, regardless of the value received from line 86 and the counter is accordingly preset to the value 15, the maximum limit value it will hold.

OPERATION OF FIGURES 2*a*–2*d*

Operation of the embodiment of the invention shown in FIGURES 2*a* through 2*d* will be fully understood by considering the typical operational example given below. In the example it is assumed that analog channel 3 is being sampled and that the signal thereon, when digitized in the converter 26 has the value 0000010101 (decimal 21). It will further be assumed that the storage location of reference data storage unit 18 associated with channel 3 contains the reference value 0000001001 (decimal 9) and that the limit bits in the storage location of unit 18 associated with channel 3 are 0101 (decimal 5). For the sake of simplicity the events occurring during the twelve bit times established by bit generator 58 will be summarized in paragraphs headed by the bit time involved.

*Bit time 1.*—Channel 3 is addressed by switch matrix 36 and a sample is supplied via line 52 to code converter 26. Code converter 26 performs the required analog to digital conversion and supplies the ten parallel binary bits on line 54 to multiplex register 28. Since the interrupt circuit 156 is not activated gates 160 and 162 are open. The address of channel 3 is also supplied to multiplex register 28 via line 60. This address is further transmitted to memory address register 62 of unit 18 via line 61 and the first read cycle of memory 18 is performed. The low order bit of the reference value and the low order bit of the limit value associated with channel 3 read from unit 18 are supplied to lines 72 and 86 respectively. The low order bit of the digitized sample is supplied from converter 26 on line 56. Serial subtracter 74 performs a subtraction of the bits (both binary ones) supplied on lines 56 and 72 and shifts a binary zero into register 78.

*Bit time 2.*—Timing instrumentation 57 controls reference data storage unit 18 to perform a second read cycle and the second low order bits of the reference value and the limit value (both binary zeros) are supplied to lines 72 and 86 respectively. Converter 26 supplies the second low order bit of the sample value (a binary zero) on line 56. The values on lines 56 and 72 are applied to subtractor 74 and their difference (a binary zero) is shifted into register 78. The second bit of the limit value is loaded via gates 90 into binary counter 88. Gates 139 for low order counter 42 are opened to supply the present low order time via cable 138 to the multiplex register 28. Register 28 now contains a complete data word suitable for storage in memory unit 16.

*Bit times 3–9.*—During each of these bit times the reference data storage unit 18 is read out and a bit of the reference value is supplied via line 72 to serial subtractor 74. Converter 26 is also caused to supply one bit of the serialized data sample during each of these bit times via line 56 to serial subtractor 72. The difference value bits produced by the subtractions occurring in each of bit times 3–9 are shifted into register 78. During bit times 3 and 4 the last two bits of the binary limit value read from storage unit 18 are loaded into binary counter 88 through gates 90.

*Bit time 10.*—The high order bits of the reference value and the sample value are read from unit 18 and converter 26 respectively via lines 72 and 56 to subtracter 74. These bits together with the borrow propagated from the next lower order subtraction are subtracted and the difference value of binary one is shifted into the high order position of register 78. Borrow Trigger 108, which was reset at the beginning of the current bit time, is set to the binary one condition by the high order borrow applied via line 106 as a result of the current subtraction. At the end of bit time 10 the value 1111110100 (the two's complement of a decimal 12) is shifted from register 78 to counter 94. The binary counter 88 contains 0101 (a decimal 5).

*Bit time 11.*—At the beginning of this bit time Trigger 118 is set to the one state. The store command Trigger 130 is also set to the one state. As bit time 11 progresses timing pulses are applied to line 95 (see timing chart of FIG. 4) and since gates 96 and 114 are open these pulses are applied to the count-down line 97 of binary counter 88 and the count-up line 116 of binary counter 94. Counters 88 and 94 are stepped in synchronism. At the end of the fifth counting pulse, binary counter 88 will have reached the all zeros condition and OR circuit 100 will cease supplying an input to Inverter 102. Accordingly, a signal will be applied through lines 104 and 134 to reset Trigger 118. At the end of the fifth counting pulse binary counter 94 will not yet have reached its all zeros condition but will be in the condition 1111111001. Accordingly, OR circuit 124 will have been continually activated and Inverter 126 will not have supplied a signal on line 128 to reset the Trigger 130. At the end of bit time 11, then, Trigger 130 will still be set to one state indicating the fact that the true difference value was greater than the limit value and that the data word located in multiplex register 28 qualifies for storage.

*Bit time 12.*—During bit time 12 the execute store signal on line 132 will cause the main data storage unit 16 to perform a storage cycle to store the data word from register 28 into the location identified by the current address in memory address register 59. The reference data storage unit 18 will also be caused to perform a storage cycle storing the information in the data value section of multiplex register 28 at the address of channel 3 which is presently contained in memory address register 62. At the end of bit time 12 timing instrumentation 57 supplies reset impulses to the several registers preparatory to commencing a new one millisecond sampling interval.

ALTERNATE EMBODIMENT—FIGURE 5

FIGURE 5 of the drawings shows in block form a somewhat modified form of the invention wherein means are provided for permitting the collection of data on a continuing basis without regard to the limitation imposed by the size of a main data storage unit. In this embodiment of the invention, two data storage units **16*a* and 16*b* are employed for storing data meeting the requirements of the system. These units 16*a* and 16*b* are connected to the multiplex register 28 via cables 210 and 212. These cables have gates 214 and 216 respectively which are controlled so that only one memory unit receives information at a time. As shown in FIG. 5 the timing and control instrumentation 57′ includes control lines 218 and 220 for operating the gates 214 and 216 in the alternative. Timing instrumentation 57′ also includes control lines 222 and 224 which are energized in the alternative to place one or the other of units 16*a* and 16*b* in a read condition. Control lines 226 and 228 from unit 57′ are operated in the alternative to place one of the storage units 16*a* or 16*b* in the write condition. At any given time, the control lines just mentioned are actuated so that one of the storage units 16*a* or 16*b* is in the read condition and the other is in the write condition. The storage unit in the write condition will have its data control gate 214 or 216 opened and the unit which is in the read condition will have its data control gate 214 or 216 closed. The unit, for example 16*a***, which is in the write condition is available to store data values which meet the criteria for storage and cooperates with the remainder of the data reduction and storage system in the manner previously described with respect to FIGURES 2*a* through 2*d*.

The other data storage unit **16*b* which is in the read status is concurrently being operated to sequentially read out its contents through its output cable 232 which is connected in common with the output cable 230 of main data storage unit 16*a* through OR circuit 234 to a utilization device generally identified by the reference character 236**. The utilization device may be, for example, a magnetic tape unit which is recording the information stored in the system provided by this invention for later handling or it may be, for example, a process control device which is using the information received to control an industrial operation.

The rate at which the unit **16*b* is reading out its contents is adjusted so that it is equal to or slightly greater than the average rate at which it is expected that incoming informaion will fill the main data storage unit 16*a*. In this manner, by the time unit 16*a* is filled, unit 16*b* will be empty and may be switched by timing and control instrumentation 57′ to receive the sampled and reduced data ·om the input system while main data storage 16***a* is mptied. As shown in FIG. 5 each of the units 16*a* and 6*b* has a "memory full" signal line 238 extending there·om upon which a signal is supplied to the timing and ɔntrol instrumentation when the associated storage unit as reached its capacity. Such a control line would extend, ɔr example, from the memory address register of the ssociated main data storage unit.

Means are provided in this embodiment of the invenon to prevent a catastrophic failure of the system in the vent that, for some reason, incoming information fills ne data storage unit at a faster rate than the other data :orage unit is being emptied. As was explained preiously, it is desirable to alter the criteria for storage 'hen more information qualifying for storage is coming ı than was anticipated, and this alteration is provided y widening the limits within which changes from preiously stored values may vary without being considered ignificant.

The limit widening control is provided in this embodiıent by comparator 240 in response to the results of comarisons between the current addresses of the memory adress registers of the two storage units 16*a* and 16*b*. Both nits, it will be recalled, are operated sequentially so that t any given time a comparison of the address currently vailable for storage in the unit servicing the data reducon and storage system and the current address being ɜad out in the unit being emptied, will determine whether ıe emptying is progressing at a slower rate than the fillıg. If this is the case, then comparator 240 supplies an utput on line 241 to widen the storage limits. This signal ıay perform the same function as the signal on line 204 ı the embodiment of FIGS. 2*a*–2*d*.

CONCLUSION

It is believed apparent from the foregoing description hat the system disclosed herein adequately handles the eduction and storage of information presented on plural ıput channels. The system is capable of treating each ıput channel on an individual basis, so that the criteria or storage may vary from one channel to another. Pririły assignments among the channels may be made on ither a fixed or flexible (interrupt) basis. The system urther accommodates situations wherein unusual amounts ·f data qualify for storage, so that a catastrophic failure ıf the system is avoided.

In the interest of simplicity, the illustrative embodiment ıf the invention is shown in somewhat elemental form. t will be apparent to those skilled in the art, however, hat the concepts presented may be extended as required o provide additional flexibility and sophistication. For xample, means may be provided for widening the limits ıy varying amounts depending upon the extent of overilling of the memory unit 16. This can be accomplished ıy establishing several fixed values to which counter 88 an be preset depending upon outputs from limit control i0. It is also possible to exempt certain channels from he widened limit condition, if desired. For example, a ritical information channel may be protected by pro'iding means to disable the output of unit 30 whenever hat channel is addressed. Further extensions of these oncepts will also be suggested by the present disclosure o those skilled in the art.

While the invention has been particularly shown and lescribed with reference to preferred embodiments thereıf, it will be understood by those skilled in the art that he foregoing and other changes in form and details may ɔe made therein without departing from the spirit and cope of the invention.

What is claimed is:

1. A data handling system including:
plural input channels upon which data is presented to said system;
means for interrogating said channels to obtain data samples therefrom;
a reference data storage unit containing reference criteria associated with each said channel;
means operable in concert with said channel interrogating means to read from said reference data storage unit the criteria associated with the channel being interrogated;
comparison means for comparing each said data sample with the reference criteria read from said reference data storage unit and for indicating the relationship of said data sample to said criteria;
a register in which each sample value is placed pending completion of operation of said comparison means;
utilization means connected to said register; and
means responsive to an indication of one predetermined relationship of the data sample to the associated criteria for causing the value to be accepted by said utilization means and responsive to an indication of another predetermined relationship for causing said value to be cleared from the register without being passed to the utilization means.

2. A data handling system including:
plural input channels upon which data is presented to said system;
means for interrogating said channels to obtain data samples therefrom;
a reference data storage unit containing reference criteria associated with each said channel;
means operable in concert with said channel interrogating means to read from said reference data storage unit the criteria associated with the channel being interrogated; and
comparison means for comparing each said data sample with the reference data storage unit and for indicating the relationship of said data sample to said criteria;
said reference criteria associated with each channel having a reference data value and limit information describing limits of difference from the said data value; and
said comparison unit being operable to indicate whether or not the data sample differs from the reference data value by an amount equal to or greater than the limits of difference described by said limit of information.

3. The invention defined in claim 2 which includes:
means responsive to an indication that the sample value does equal or exceed the limits of difference from the reference value for storing the sample value in said reference data storage unit in place of the reference value to which it was compared.

4. A data reduction and storage system comprising:
plural input channels upon which data is presented to said system;
interrogation means for interrogating said channels one at a time, to obtain data samples therefrom;
a register connected to said interrogation means for temporarily holding each said data sample;
means associated with said interrogation means and operable upon the obtaining of a sample for placing in said register information identifying the channel from which the sample was obtained;
means operable upon the obtaining of a sample to place in said register information identifying the time-of-occurrence of said sample;
a main data storage unit connected to said register and operable to store the data sample together with said channel identifying and time-of-occurrence information upon receipt of a store command;
a reference data storage unit having an addressable storage location associated with each said channel and containing reference criteria relating to said associated channel;
means operable upon the obtaining of a sample for reading from the reference data storage unit the contents of the addressable register associated with the channel from which the sample was obtained; and comparison means operable upon the obtaining of a data sample for receiving the sample and the reference criteria read from the reference data storage unit and for determining the relationship of said sample to said criteria, said comparison means supplying a store command to said main data storage unit in response to determination of a predetermined relationship.

5. The invention defined in claim 4 including means responsive to said store command for modifying the criteria in the addressable location of the reference data storage unit associated with the channel from which said sample was obtained.

6. The invention defined in claim 5 wherein the criteria associated with each channel includes a reference data value and limit information specifying limits of difference from said reference data value, and wherein the comparison means supplies a store command when the sample value differs from the reference data value by an amount equal to or greater than the said limits of difference, and wherein the means for modifying the criteria in response to a store command comprises means to store the sample value in the reference data storage unit in place of the reference data value with which said sample value was compared.

7. The invention defined in claim 4 wherein the data channels present information in at least two forms, and which includes conversion means coupled to certain channels for converting data samples received therefrom to a form similar to the form of data received from other channels.

8. The invention defined in claim 4 wherein certain channels are interrogated in fixed sequence and wherein interrupt means are provided, said interrupt means being activated in response to occurrence of information in one predetermined channel to disconnect the channels being interrogated in fixed sequence and to obtain a sample from said predetermined channel.

9. The invention defined in claim 4 which includes limit control means comprising:

means operable to monitor the number of samples stored in the main data storage unit during a predetermined time span;

means for specifying numbers which relate to the number of samples that can be properly accommodated without overtaxing the system;

determining means for determining when the monitoring means indicates storage of a number of samples in excess of the number which can be properly accommodated, said last named means providing a signal upon occurrence of said determination; and means responsive to said signal for supplying substitute limit information to said comparison means in place of the limit information read from the reference data storage unit.

10. The invention defined in claim 9 wherein said monitor means comprises:

means for indicating the current available address of the main data storage unit;

the means for specifying numbers comprises means for indicating current time within a predetermined time span; and the determining means comprises a comparator for comparing at least part of the present address with at least part of the time indication.

References Cited

UNITED STATES PATENTS

| | | | |
|---|---|---|---|
| 2,922,990 | 1/1960 | Anderson | 340—172.5 |
| 3,094,609 | 6/1963 | Weiss | 340—172.5 |

ROBERT C. BAILEY, *Primary Examiner.*

G. SHAW, *Assistant Examiner.*